S. W. LITTLE.
SECURING SAWS TO SPINDLES.
No. 173,126. Patented Feb. 8, 1876.
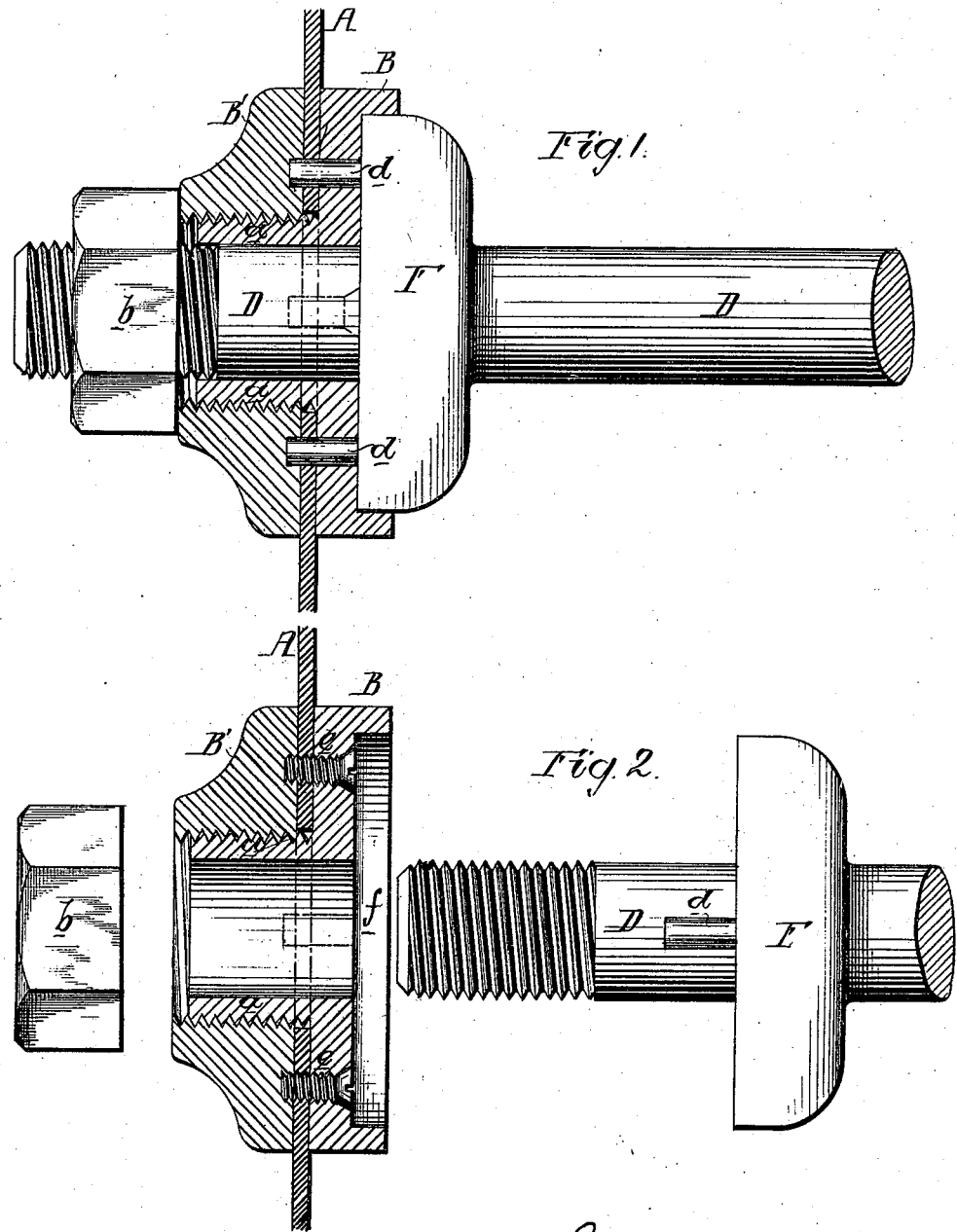

UNITED STATES PATENT OFFICE.

SAMUEL W. LITTLE, OF EVANSVILLE, INDIANA.

IMPROVEMENT IN SECURING SAWS TO SPINDLES.

Specification forming part of Letters Patent No. 173,126, dated February 8, 1876; application filed December 17, 1875.

*To all whom it may concern:*

Be it known that I, SAMUEL W. LITTLE, of Evansville, Vanderburg county, Indiana, have invented an Improvement in Securing Saws to Spindles, of which the following is a specification:

The object of my invention is to so secure a circular saw between clamps to its spindle or arbor as to prevent the turning of the said saw independently of the latter; and this object I attain in the manner which I will now proceed to describe, reference being had to the accompanying drawing, in which—

Figure 1 is a vertical section of my improved saw-holding device, and Fig. 2 a sectional plan showing the parts detached from each other.

A is the blade of the saw, which is clamped at the center between two rings, B and B', the former having a central annular projection, $a$, which extends through the eye of the saw, and is threaded at the outer end for the reception of the ring B'. To the central opening of the ring B and projection $a$ is adapted the spindle D, which is threaded at its outer end for the reception of a nut, $b$, and is provided with a collar, F, adapted to a circular recess, $f$, in the face of the ring B. This collar F has two pins, $d$ $d$, which fit into openings in the rings B B', and pass through corresponding openings made in the blade of the saw. The saw is first slipped over the projection $a$ of the ring B, and the ring B' is then screwed onto the said projection, and, after the saw has been properly centered, is screwed up tight, so as to firmly clamp the blade and prevent any lateral movement. The saw and its rings are then slipped onto the end of the spindle until the collar F rests in the socket $f$ in the ring B, and its pins $d$ fit into the openings provided for them. By this means, when the saw has been removed from the spindle for sharpening or other purposes, the replacing of the same in its proper position in relation to the spindle is insured.

It will be evident that the above-described device can be readily removed from one saw and attached to another when such a change becomes necessary. Additional security may sometimes be attained by using bolts $e$ $e$, which pass through the saw and into the ring B', and, besides binding the same more firmly to the said ring, aid in preventing independent turning of the latter.

I claim as my invention —

1. The combination of the circular saw A with the clamping-ring B, having a tubular threaded projection, $a$, adapted to a threaded opening in the ring B', and with steadying-screws $e$ $e$, as set forth.

2. The combination of the collar F on the spindle D, having pins $d$ $d$, adapted to corresponding openings in the clamping-rings B B' and the saw, with the nut $b$, as and for the purpose set forth.

In testimony whereof I have signed my name to this specification in the presence of two subscribing witnesses.

SAMUEL W. LITTLE.

Witnesses:
T. W. TURNER,
P. MAIER.